United States Patent [19]
Johnson

[11] Patent Number: 5,026,432
[45] Date of Patent: Jun. 25, 1991

[54] METHOD AND APPARATUS FOR REMOVING AND DISPOSING OF CONTAMINATED CONCRETE

[75] Inventor: Dennis W. Johnson, Barberton, Ohio

[73] Assignee: ENSR Corporation, Houston, Tex.

[21] Appl. No.: 392,889

[22] Filed: Aug. 14, 1989

[51] Int. Cl.⁵ .................................... B08B 5/04
[52] U.S. Cl. ............................ 134/21; 134/26; 134/38; 134/40; 134/42
[58] Field of Search ............ 241/22; 134/21, 38–40, 134/25.1, 25.4, 26, 40; 141/18

[56] References Cited

U.S. PATENT DOCUMENTS 4,729,413  3/1988  Shults ................................. 141/2
4,774,974  10/1988  Teter .................................. 134/21

Primary Examiner—Asok Pal
Attorney, Agent, or Firm—Felfe & Lynch

[57] ABSTRACT

The present invention is directed to a method and apparatus for removing contaminated masonry such as contaminated concrete in large volumes and continuously collecting the contaminated material in a series of containers. More specifically, the present invention is directed to a system for removing contaminated concrete contaminated with a hazardous material such as PCBs and collecting and treating the contaminated concrete so as to safely dispose of the contamination material.

17 Claims, 4 Drawing Sheets

METHOD AND APPARATUS FOR REMOVING AND DISPOSING OF CONTAMINATED CONCRETE

FIELD OF THE INVENTION

The present invention is directed to a method and apparatus for removing contaminated masonry such as contaminated concrete in large volumes at high rates and simultaneously collecting the contaminated material in a series of containers. More specifically, the present invention is directed to a system for removing contaminated concrete contaminated with a hazardous material such as polychlorinated biphenyls (PCBs) and collecting and treating the contaminated concrete so as to safely dispose of the contamination material.

BACKGROUND OF THE INVENTION

To fully appreciate all aspects of the present invention it is necessary to understand the constraints associated with the removal of contaminated masonry, which herein means concrete, stone, rock, brick, tile or any material having the same characteristics as these materials, and the apparatus used in the system of the present invention for handling these contaminated materials. These constraints are different than those which are normally present when removing non-contaminated masonry such as concrete. The conventional approach and apparatus to remove concrete for example is one of brute force such as with jack hammers, destruction balls or explosives. In the removal of contaminated masonry such as contaminated concrete, the first constraint is the removal and handling of the contaminated material not simply the breaking and/or removal of the concrete, for example. Accordingly, the tools or apparatus used in the system of the present invention are adapted to remove small amounts of the surface at any one time without damaging the underlying concrete or material since the object is to remove only the contamination.

Tools or apparatus are available for the surface removal of concrete and the like. Partner Industrial Products has a brochure of hand held tools and some tools which are mounted with wheels to be held or operated from a handle such as "Chippers", "Paving Breakers", or saws and the like. Each of these tools or apparatus produces a very small broken particle and considerable fines or dust. It is these particles and fines or dust when removing contaminated masonry such as concrete that presents the danger. When these pieces are contaminated with hazardous material, these contaminated pieces must be fully contained. None of these tools have any containing apparatus associated with these tools. It should be understood that merely providing a vacuum removal to a tool does not necessarily contain the material because it may not provide a closed system. A closed system requires the containment of essentially all the contaminated material in apparatus or containers which are easily and safely handled.

A further problem with the tools and apparatus of the prior art is that the tools are not designed for the removal of large volumes of material to be removed and collected. Apparatus which will collect a single container of non-contaminated material and requires shutting off before filling a second container or does not provide a closed system is totally inadequate to collecting large volumes of contaminated material which will require the filling of a series of containers in a closed system. Larger machines such as disclosed in a sales brochure of the Marindus Co., Inc. for a machine called the "VON ARX FR 300" is a machine with rotating flails, loosely mounted on a rotating drum hammer and scratches the surface or in a technical sales piece of Macdonald Air Tool Corporation entitled "Effective Concrete Surface Preparartion" for a machine called the "SCABBLING MACHINES" or in a sales brochure of the Blastrac Division of the Wheelabrator Corporation for machines called "Blastrac" are known. However, even when these larger machines have been modified with a vacuum system they have the problem of operating at large rates of removal or in maintaining a closed system once the single container associated with such equipment is filled. Most of the machines disclosed do not disclose a vaccum attachment but those which do are all limited to the single container in which the broken concrete is collected. The limitations of these machines is also present in tools and machines made by Pentex, Inc. As disclosed in "Pentex Ink" a publication of Pentex, Inc. volume 5, No. 1, spring 1989, a combination of hand held tools and a vacuum system was used to remove about ⅜ of an inch of concrete from wall surfaces and up to ½ of an inch of concrete from floor surfaces. The vacuum system used with the tools was "VAC-PAC", a vacuum system manufactured and sold by Pentex, Inc., which includes a drum. However, the system when the drum is not attached is an open system and requires that both the concrete removal tool or device as well as the vacuum system be turned off for replacing a filled drum. Furthermore, when the drum is removed, particles and dust in the filter device may fall out the opening. A sales brochure from Pentex is entitled "The Moose from Pentex" which discloses a large machine equipped with a vacuum attachment; however, it has a single container which is about a half drum size. Again, once this drum is filled the "Moose" must be shut off to empty the drum or the material cannot be contained. Thus, such machines cannot maintain essentially continuous operation while containing the broken material in a closed system.

In the handling of contaminated masonry such as concrete contaminated with various hazardous materials the danger is failing to contain the contaminant. The system of the present invention overcomes this danger which can not be solved by the prior art by maintaining the broken contaminated masonry including the very fine dust particles in a closed system while simultaneously filling a series of containers. A closed system is one in which the contaminated material is handled safely without exposure to the fine dust produced in breaking the masonry in the first instance until the contaminated material including essentially all the fine material is contained within a container which can be safely handled. In addition the system of the present invention provides for the safe disposal of the contaminated masonry as well as the replacement of the removed contaminated masonry.

SUMMARY OF THE INVENTION

The present invention is directed to a method and apparatus for removing contaminated masonry such as contaminated concrete in large volumes at high rates over substantial periods of time and simultaneously collecting the contaminated material in a series of containers. More specifically, the present invention is directed to a system for removing contaminated concrete contaminated with a hazardous material such as PCBs and collecting and treating the contaminated concrete so as to safely dispose of the contamination material. The present invention is also directed to the apparatus for removing contaminated masonry such as concrete contaminated with various hazardous materials in large volumes. A preferred apparatus comprises a breaking apparatus having a vacuum attachment for pneumatically removing the broken and chipped material as well as all the dust produced by the breaking apparatus, a pneumatic hose which connects the breaking apparatus to a separation and collecting apparatus which separates or dislodges the contaminated materials from the pneumatic air stream and collects the material in a closed system while simultaneously filling a series of containers and a vacuum apparatus which preferably includes a centrifugal pump to provide the vacuum or pneumatic air stream from the source of the material being collected through the separation and collecting apparatus. The preferred apparatus further includes a high efficiency particle arrestor filter just prior to the centrifugal pump whereby 99.97% of all particles to 0.3 microns are removed and has an optional provision for connecting a charcoal filter to remove vaporous contaminants, for example, mercury. It is also preferred that the centrifugal pump have a silencer on the outlet to reduce noise to a safe level.

BRIEF DESCRIPTION OF THE PREFERRED EMBODIMENT

Figure 1:
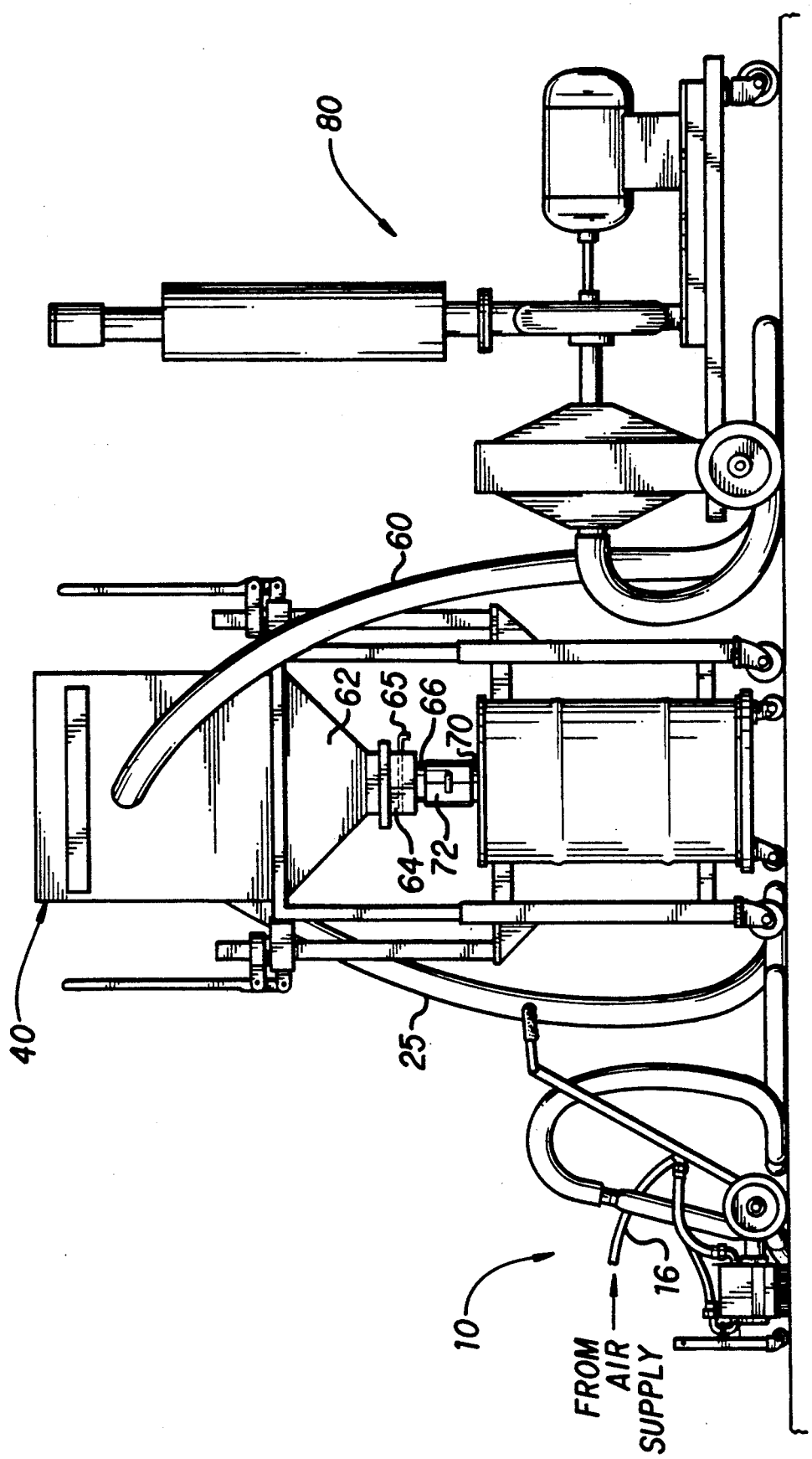
FIG. 1 is a perspective view of a system of the present invention for removing contaminated concrete or other masonry and collecting the contaminated material in a series of containers which includes a concrete breaking apparatus, a separation and collecting apparatus and a pneumatic air stream or vacuum producing apparatus.

Referring now to FIG. 1, the system of the present invention for removing contaminated masonry such as concrete in large volumes and simultaneously collecting the contaminated masonry in a series of containers comprises a breaking apparatus 10, a separation and collecting apparatus 40 and a pneumatic or vacuum apparatus 80. The tools or apparatus used as a breaking apparatus 10 in the system of the present invention are preferably those which remove small amounts of the surface at any one time without damaging the underlying concrete or material since the object is to remove only the contamination. The apparatus used to break the concrete or the like which is contaminated by a hazardous material such as PCBs all are adapted with a pneumatic or vacuum system which removes the broken contaminated concrete in a closed system. Hazardous materials other than PCBs such as nuclear or radiation contamination or other chemicals are understood to be included as known contaminants which the system of the present invention may remove. The breaking apparatus or tools 10 which are employed to break the masonry or concrete in the present invention are all of a kind which chip or break the surface but are not breaking or harming the underlying base. The size of the machine or tool that is used has the common feature that the machine or tool is preferably designed for ease and simplicity of operation and to be handled by a single person. Further, the person need not be encumbered with hazardous material safety wearing apparel and associated equipment.

The preferred separation and collecting apparatus 40 of the present invention permits continuous operation while maintaining a closed system even when simultaneouly filling a series of containers. A preferred container is a drum. A preferred apparatus 40 has a filter system which separates the contaminated masonry and collects the contaminated material in a closed system with a continuing operation of the breaking apparatus 10 while simultaneouly filling a series of drums.

The preferred pneumatic or vacuum apparatus 80 includes a low power vacuum producing device. The preferred device is a centrifugal pump. A high efficiency particle arrestor (HEPA) filter assures that any contaminated material leaving the separation and collecting apparatus in the pneumatic air stream is contained within a safe container. The centrifugal pump may have a silencer to reduce noise.

Since in most instances the contamination of the masonry or concrete is in a building or a closed structure, a size limitation on all the equipment employed is a feature of the present invention in that all apparatus is made so that one or two persons can easily handle all the necessary tools or apparatus and additionally is not constrained by the requirements of going through doorways and other restrictions merely to get to the location of the contaminated masonry. These limitations are also imposed on the associated equipment to be used in the system of the present invention. Thus, the apparatus employed in the system of the present invention is sized to be movable by one or two persons without the requirements of large pieces of power equipment, or the need of equipment which could not be utilized in the tight constraints where most contaminated masonry is found. The apparatus, tools or associated equipment used in the system of the present invention is designed to be less than 7' in height and 30" in any dimension so as to be able to pass through doorways, elevators and the like which are the usual constraints of a building.

Figure 2:
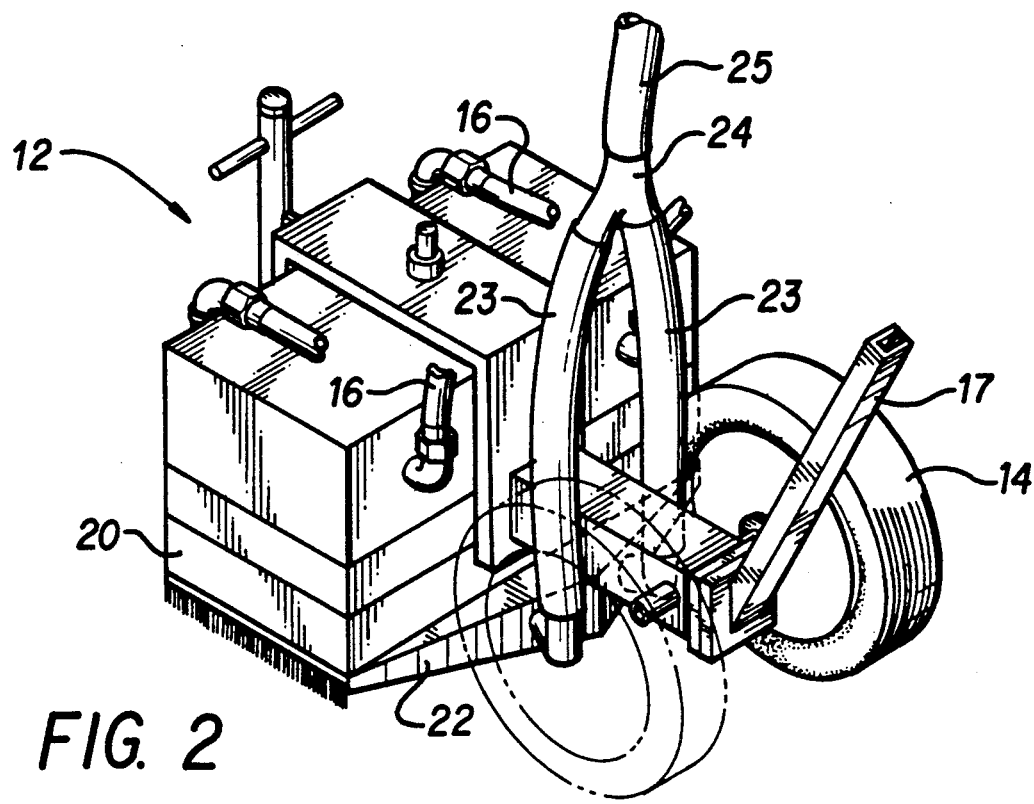
FIG. 2 is a perspective view of a concrete breaking apparatus modified with the vacuum attachment needed for the system of the present invention.

Adaptations have been made to apparatus or tools which are available in the market place but required modification to add a vacuum attachment. Likewise apparatus or tools having a vacuum system have been adapted for the system of the present invention. One apparatus which was modified to add a vacuum attachment is shown in FIG. 2. This apparatus is a machine having a head which has several cutting bits, preferably five bits, each having tungsten carbide tipped cutting bits. Such a machine is manufactured and sold by Macdonald Air Tool Corporation and is called a "U" Range Scabbler. The "U" Range Scabbler was modified by placing a 4" plastic block on the bottom of the Scabbler 5 which surrounds the individual cutting bits and has a vacuum attachment fixed to the block. Each bit is powered by compressed air. The plastic block and vacuum attachment prevents the broken up concrete and dust from escaping from the bottom or impact area of the Scabbler. The modifications are shown in FIG. 2 and FIG. 3.

Figure 3:
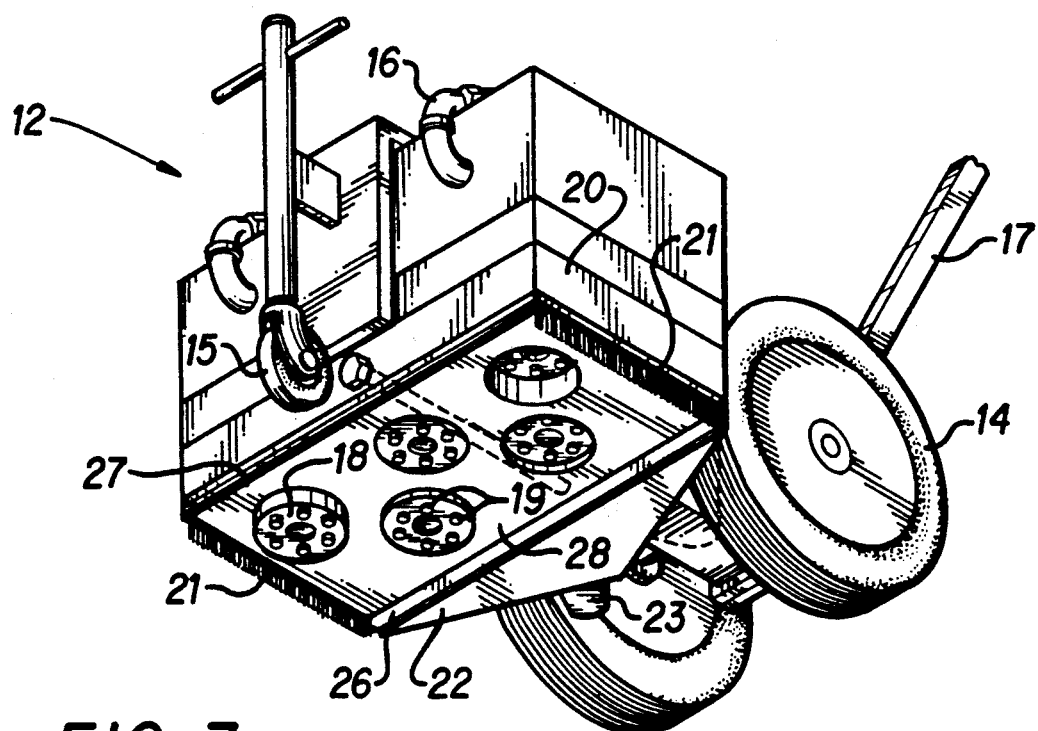
FIG. 3 is a perspective view of the bottom of the concrete breaking apparatus showing the vacuum attachment of the present invention across the back face.
Figure 5:
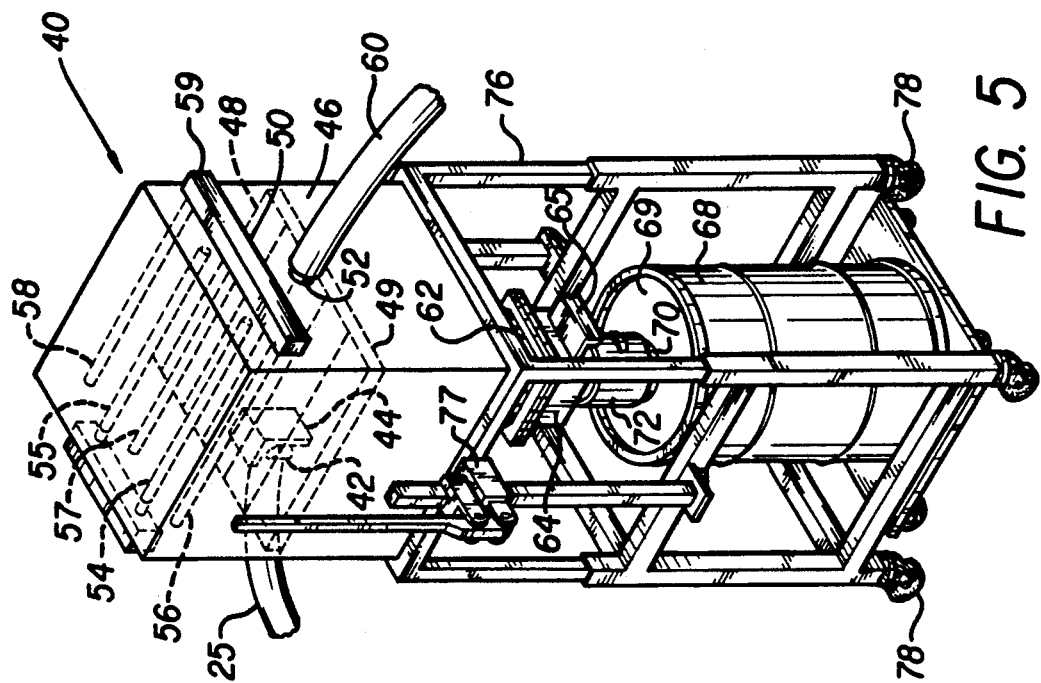
FIG. 5 is a perspective view, partially in section, of the separation and collecting apparatus used in the system for collecting the contaminated concrete according to the present invention.

Referring now to FIG. 2 and 3, a modified Scabbler machine or tool 12 is shown. The machine 12 rides on two back wheels 14 and a single front wheel 15 for transportation purposes. The plurality of cutting bits or powered chisels are powered by compressed air through line 16. A handle 17 is held by the operator to position the machine 12 over an area of contaminated concrete or other material to be broken up and removed. The specific modifications to the machine 12 are more clearly shown in FIG. 3 wherein a block of plastic 20 surrounds each of the cutting bits 18. Each cutting bit 18 may have tungsten carbide cutting tips 19. The cutting bits 18 are sequentially driven to impact the concrete or other material to be broken. During operation, only the back wheels 14 are contacting the surface being broken and the back wheels 14 are used for leverage to move the machine 12 over the surface. The block 20 provides a restraint for the broken and chipped concrete and dust. On each side of the block 20 are provided brushes 21. The brushes 21 constrain the broken and chipped concrete and dust within the area under block 20. At the back of block 20 is provided a vacuum pick up 22. The vacuum pick-up 22 is tapered in a V and at each of the sides is a intake hose 23. Each of the hoses 23 go to a header 24 and to a single hose 25.

The size of the inlet or opening 26 to the vacuum pick-up 22 is significant. Opening 26 which extends across the block 20 draws air in through the open face 27 of the block 20 and across the surface 28 of the block 20. It has been found that the opening 26 should exceed ⅜ of an inch and is preferably ½ of an inch. A smaller size opening results in pluggage or blockage of the inlet 26 to the vacuum pick-up 22. The modification as specifically set forth provides an apparatus which has the same high capacity of the machine for breaking concrete of other material as designed but will not disperse any dust into the work place so that the contaminated concrete poses no safety problem to the operator and any cross-contamination to non-contaminated areas is prevented.

Another apparatus designed for breaking up concrete is a machine manufactured by the Blastrac division of the Wheelabrator Corporation. This machine has in its design a pneumatic air handling system. The apparatus uses metallic abrasive material or shot that are propelled against the concrete surface by a rapidly rotating blast wheel. The metallic abrasive or shot are drawn from the concrete surface together with the broken up concrete and spent abrasive by a pneumatic system. Within the apparatus the metallic abrasive or shot are separated from the concrete and returned to the rotating blast wheel. The pneumatic system thus provides the pick-up for the metallic abrasive or shot to maintain them within a wheel like system. Such a Blastrac machine may be employed in the system of the present invention.

Figure 4:
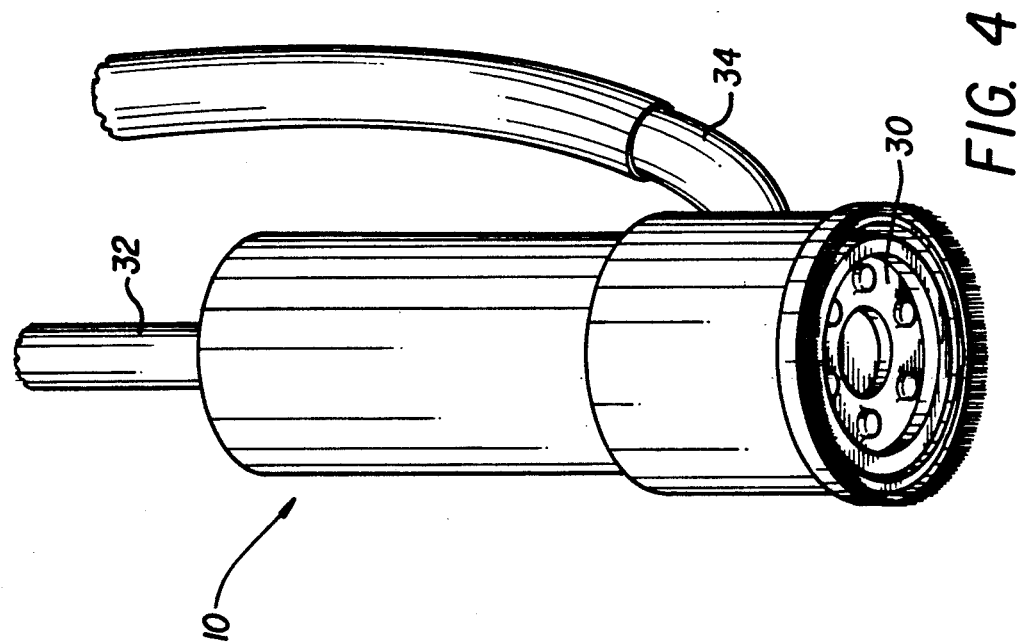
FIG. 4 is a perspective view of another concrete breaking apparatus or device with a vacuum attachment which may be used in the system of the present invention.

Other tools have been designed to chip and break concrete. Referring to FIG. 4 is a tool 10 referred to as a single-head scabbler. It has a common feature with the Scabbler machine in that it has a cutting bit 30 which may be driven by compressed air through a line 32. Line 32 may also be a handle for holding the tool. A vacuum attachment 34 is positioned to remove the material which is broken by the bit 30. The design of the vacuum attachment 34 is to remove all the broken and chipped material and dust produced when using such a tool.

It should be understood that the apparatus 10, which may be employed in the system of the present invention, may include all of the foregoing described breaking tools but in addition can include a concrete saw or a crack chaser, all tools which are presently known for the breaking or cutting of concrete or other masonry. However, the common modification to each of these tools to be employed in the present invention is that they must be able to incorporate a vacuum attachment which removes all the contaminated concrete without permitting dust on the operator or into the atmosphere to contaminate non-contaminated areas.

The separation and collecting device 40 of the present invention is uniquely designed to be operated continuously while simultaneously filling a series of containers with the contaminated broken and chipped concrete and dust. Hose 25 which is connected to a breaking apparatus 10 has a quick connection to an inlet 42 of the separation and collecting device 40. A baffle 44 directs the pneumatic stream containing the broken and chipped concrete entering inlet 42 to veer downward which causes the concrete particles to separate from the pneumatic stream and be collected in chamber 46. At the top of chamber 46 is a filter system 48 which seals the chamber and defines a plenum 50 above the filter system 48. In a specific embodiment of the separation and collecting device 40 there are five filters making up the filter system 48. As specific filters, a Gortex cartridge filter, which is a fabric filter that has excellent characteristics for durability, filter efficiency and release of filtered materials, is preferred. Such a filter system 48 has sufficient air to cloth ratio for the air volume required to operate with either the Blastrac machine which produces a fine particle dust or a modified Scabbler machine which produces a range of particles from about ½ of an inch to very fine dust. In the plenum 50 is an outlet 52 for the pneumatic air stream which is introduced into the lower portion of chamber 46 and drawn through the filter system 48. The larger and some fine particles are separated from pneumatic air stream simply by striking the baffle 44 and falling into chamber 46. The smaller particle material collect on the outer surface of the filters attached to the lower surface 49 of the filter system 48. In the plenum chamber 50 are a series of "reverse pulse" nozzles extending above each of the specific filters making up the filter system 48. A nozzle extends above each filter for pulse blowback to dislodge the material which collects on the filter cartridges at the lower surface 49 of the filter system 48. Nozzle 54 and 55 may be connecting to a separate header, while nozzles 56, 57 and 58 are connected to a separate header 59. By injecting compressed air into the headers, such as header 59, material collected on the lower surface 49 of those filters can be back flushed so as to drop off into chamber 46. Appropriate valving allows three of the five filters to be back flushed or two of the five to be back flushed or all five filters to be back flushed. Likewise, the back flushing can be done automatically in a time cycle or on an as needed basis as determined by the pressure drop between inlet hose 25 and the outlet hose 60. The filter system 48 therefore provides a means for separating all except the most fine particles in the pneumatic air stream. The contaminated concrete, for example, is not only separated but collected continuously in chamber 46 of the separation and collecting device 40.

The lower portion of chamber 46 is tapered. The tapered portion 62 (FIG. 1), which has an included angle of about 55°, tapers to a slide valve 64 having a slide 65 which can be opened or closed. Extending below the slide valve 64 is a tubular portion 66. A drum or container 68 is positioned below the slide valve 64 and chamber 46. The drum may be placed on a wheeled dolly for ease of handling, especially of the filled drum. The presence of the valve 64 provides the closed system since the valve 64 may be closed when no drum is present or may be opened only when a drum is securely in place.

Figures 6, 7:
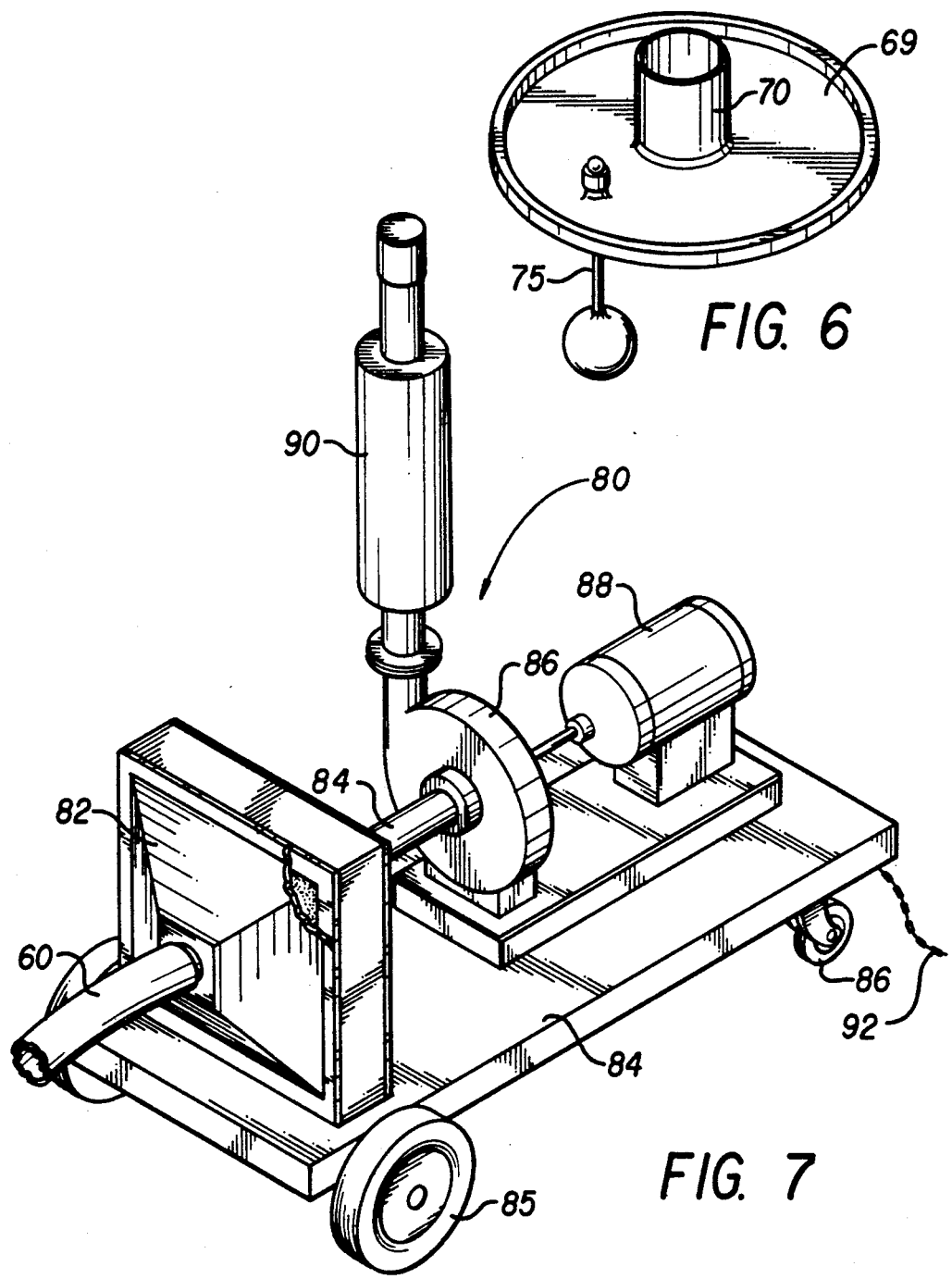
FIG. 6 is a perspective view of a drum lid adapted to be connected to the separation and collecting apparatus showing an indicator for noting when a drum is almost filled.
FIG. 7 is a perspective view of the pneumatic-vacuum apparatus including a centrifugal pump used to provide the pneumatic air stream or vacuum, a filter positioned before the pump and a silencer on the discharge of the pump used in the preferred system of the present invention.

A special lid 69 as shown in FIG. 6 is placed on the drum 68. The lid 69 has a corresponding tubular portion 70 which corresponds in diameter to that portion 66 below the slide valve 64. These two portions 66 and 70 can be aligned, essentially touching each other, and then are secured by a flexible clamp 72. The clamp has a portion which surrounds tubular portion 66 and 70 so as to seal these two portions for the flow of concrete from chamber 46 when the valve 65 is opened into the drum 68. Even though the valve 64 is open, the clamp 72 and drum 68 still maintain a closed system.

The lid 69 may have an indicator 75 giving an indication of when the barrel 68 is about to be full. This indicator 75 is simply a rotating probe or paddle which extends down into the barrel from the lid 69 so than when the probe comes into contact with material such that when the rotation of the probe is slowed or stopped the probe gives a signal. The signal that the barrel 68 is becoming full signals the operator to close the valve 65 so that the barrel 68 can be replaced by another barrel. When the valve 64 is closed there is sufficient space in chamber 46 to collect all material during the continuous operation of a breaking apparatus 10 and the removal of the contaminated concrete into the separation and collecting device 40. It takes only a matter of minutes to remove the clamp 72 from the filled barrel 68 and remove that barrel out of position and place an empty barrel in its place. The special lid 69 is removed from the filled barrel and placed on an empty barrel 68 and reconnect to the tubular portion 66 of the collecting device 40. Valve 64 is then opened for the material which has been collected in chamber 46 to slide down the incline portion 62 into the new barrel. The separation and collecting device 40 provides for a continuous operation wherein the broken and chipped concrete and dust is safely collected within chamber 46 or barrel 68 on a continuous basis even though a series of containers or barrels 68 are filled in the operation.

One other feature of the separation and collecting device 40 is that the frame is preferably made of tubular stock 76. The tubular stock 76 may slide within another tubular member of larger diameter or slide separately, as shown. A jack device 77 is provided so that the upper portion of separation and collecting device 40 can be raised for placing the barrel 68 in position under valve 64. On the other hand the upper portion of the separation and collecting device 40 can be lowered for moving the entire device 40 in and out through doorways. At the lower portion of stock 76 are wheels 78 to make movement of the separation and collecting device 40 easy.

The hose 60 connects separation and collecting device 40 to the vacuum apparatus 80 of the present invention through a sweep elbow which prevents stress on the hose 60. As shown in FIG. 7 the vacuum apparatus 80 comprises a filter 82. Filter 82 is a high efficiency particle arrestor (HEPA) filter mounted on a frame 84. The frame 84 has first wheels 85 and castor back wheels 86 for ease of moving the vacuum apparatus 80. Filter 82 being a high efficiency particle arrestor removes 99.97% of all particles to 0.3 microns and all contamination contained therein. Filter 82 is enclosed within a holder and the whole filter can be thrown away and replaced with a new filter periodically. The filter 82 is in front of the inlet pipe 84 to a centrifugal pump 86. The centrifugal pump 86 is driven by a motor 88. In a preferred embodiment motor 88 is an electrical ten horse power motor. A preferred centrifugal pump 86 is an Invincible Turbo Flow 6000-10 air mover rated at 90" of water vacuum, 500 standard cubic feet per minute (SCFM). This blower gives sufficient air flow at the cutting and breaking interface of the breaking apparatus 10 and overcomes the pressure drops due to the lengths of hose 25 and 60 and the filter system 48. On the outlet of centrifugal pump 86 is a silencer 90 which maintains the noise level below 85 dB. All hoses including hose 25 and 60, are "static dissapating" so that any static charges created during pneumatic conveyance of dry particles are discharged to ground or the blower frame can be directly grounded. The blower frame 84 has a drag chain 92 that acts as a ground or the blower frame can be directly grounded. An optional provision is to install a charcoal filter between filter 82 and centrifugal pump 86 to remove contaminants which may become vaporous during the removal of contaminated masonry, for example, mercury.

The breaking apparatus 10, the separation and collecting apparatus 40 as well as the vacuum apparatus 80 are portable, easily moveable units that can be used in spaces where contaminated concrete exists. The system of the present invention for breaking and collecting the contaminated concrete provides a substantially closed system. All of the broken and chipped contaminated concrete and dust is carried by the pneumatic air flow to he separation and collecting apparatus 40 where the contaminated concrete is contained in safe receptacles for movement and disposal.

The preferred drums to be used in the system of the present invention are 17C-DOT drums. The designation 17C means that the drums are open topped drums. The lids to these open topped 55 gallon drums are provided with seals or gaskets on the lids. The DOT designation indicates that they need the Department of Transportation specification as to gauge of material for highway transportation of hazardous waste materials. Such drums are designed to be leak free under standards for vacuum, pressure and handling. These 55 gallon drums will hold approximately 7 cubic feet of contaminated concrete. It is noted however, that 7 cubic feet of concrete fine material in a drum is approximately $3\frac{1}{2}$ cubic feet of concrete floor or an area just in excess of $6' \times 6' \times 1''$. By utilizing such drums which may be sealed, the contaminated concrete may be manifested to a landfill for disposal of the hazardous waste material. However, it is recognized that the placing of drums in a secured landfill has a continuing liability.

While the apparatus for removing the broken contaminated masonry for concrete and collecting the contaminated material in a series of containers is an aspect of the system of the present invention, the complete system goes further. First the system of the present invention deals with the surface which has been broken or chipped to remove the contaminant and all of the contaminated masonry or concrete. This is accomplished by the use of special concretes or replacement materials which are quicksetting and adhere to existing structures in small layers or other suitable replacement materials, and becomes part of the overall system of the present invention. These special replacement materials are known materials such as polymer concrete materials. A methyl methacryate (MMA) material is sold by Silikal North America, Inc. Other special materials whether acryates or epoxies are available. More importantly, the complete system of the present invention includes treating the contaminated masonry to decontaminate the large volumes of contaminated concrete that is now safely within a series of containers. This overcomes the problems are costs associated with the disposal in an approved landfill or disposal by incineration of the contaminated material.

It is preferred that the contaminated masonry or concrete be treated according to the present invention in a manner where the contaminant is removed from the contaminated masonry and concentrated for its disposal without the presence of the masonry or concrete. One aspect of the present invention is to treat the contaminated material by a simple solvent extraction to remove the contaminant contaminating the concrete. Since the contaminated material has been collected in containers such as drums which can be easily handled and transported the material may be treated in a relatively small and simple solvent extraction unit. The choice of solvent may be a hydrophobic solvent such as hexane or pentane or one of the other hydrocarbon solvents or a hydrophilic solvent such as acetone or methanol. The choice of solvent primarily depends upon the particular contaminant in the masonry or concrete. Preferably the solvent is a low boiling solvent having a low heat of vaporization and a low cost. However, if water is present in the contaminated material, either because of surface water or water entrained in the concrete or masonry, a hydrophobic solvent may be used with a surfactant such as disclosed and described in U.S. patent application Ser. No. 07/289,219. With the low boiling solvents, a simple processor may be used to recover a contamination-free solvent from the contaminant thereby concentrating the contaminant for safe disposal. Such a treating reduces significantly the volume of material requiring disposal. It is understood that chemical treatments are also possible.

I claim:

1. A method for removing contaminated masonry in large volumes and simultaneously collecting same in a series of containers which comprises:
   (a) breaking said contaminated masonry into pieces in the presence of a vacuum which pneumatically removes said pieces to a collector; and
   (b) simultaneously collecting said pieces in a closed system while filling said series of containers.

2. A method according to claim 1 which further includes:
   (c) decontaminating said pieces from said containers to remove the contaminant from said masonry.

3. A method according to claim 1 which further includes:
   (c) replacing said removed masonry with a suitable replacement material.

4. A method for removing contaminated masonry in large volumes and simultaneously collecting the same in a series of containers which comprises:
   (a) breaking said contaminated masonry into pieces in the presence of a vacuum provided by a pneumatic air stream;
   (b) pneumatically removing said pieces to a collector;
   (c) separating said contaminated masonry from said pneumatic air stream; and
   (d) simultaneously collecting said pieces in a closed system while filling said series of containers.

5. A method according to claim 4 which further includes:
   (e) decontaminating said pieces from said containers to remove the contaminant from said masonry.

6. A method according to claim 4 which further includes:
   (e) replacing said removed masonry with a suitable replacement material.

7. A method according to claim 4 which further includes:
   (e) decontaminating said pieces from said containers to remove the contaminant from said masonry; and
   (f) replacing said removed masonry with a suitable replacement material.

8. A method for removing and treating contaminated masonry which comprises:
   (a) simultaneously collecting pieces of contaminated masonry in a closed system while filling a series of containers; and
   (b) decontaminating said pieces from said containers to remove the contaminant from said masonry.

9. A method according to claim 8, wherein said decontaminating is solvent treating of said contaminated masonry.

10. A method according to claim 9, wherein said solvent is a hydrophobic solvent having a low boiling point and a low heat of vaporization.

11. A method according to claim 9, wherein said solvent is hydrophilic and has a low boiling point and low heat of vaporization.

12. A method for removing and treating contaminated masonry which comprises:
   (a) breaking said contaminated masonry into pieces in the presence of a vacuum;
   (b) pneumatically removing said pieces to a collector;
   (c) simultaneously collecting said pieces in a closed system while filling a series of containers; and
   (d) decontaminating said pieces from said containers to remove the contaminant from said masonry.

13. A method according to claim 12 which further includes:
   (e) replacing said removed masonry with a suitable replacement material.

14. A method according to claim 13 wherein said decontaminating is solvent treating.

15. A method according to claim 1, 2, 3, 4, 5, 6, 7, 8, 9, 10, 11, 12, 13 or 14 wherein said contaminated masonry is contaminated concrete.

16. A method according to claim 1, 2, 3, 4, 5, 6, 7, 8, 9, 10, 11, 12, 13, or 14 wherein said contamination is polychlorinated biphenyls (PCBs).

17. A method according to claim 1, 2, 3, 4, 5, 6, 7, 8, 9, 10, 11, 12, 13 or 14 wherein said contaminated masonry is contaminated concrete contaminated with polychlorinated biphenyls (PCBs).

* * * * *

UNITED STATES PATENT AND TRADEMARK OFFICE
CERTIFICATE OF CORRECTION

PATENT NO. : 5,026,432

DATED : June 25, 1991

INVENTOR(S) : Dennis W. Johnson

It is certified that error appears in the above-identified patent and that said Letters Patent is hereby corrected as shown below:

Column 2, line 6 delete "preparartion" and insert
- - preparation. - -

Column 2, line 15 delete "vaccum" and insert
- - vacuum. - -

Column 8, line 47, in the phrase "to he separation...",
delete "he" and insert - - the - -.

Column 9, lines 20-22, in the phrase, "this overcomes the
problems are costs
delete "are" and insert - - of - -.

Signed and Sealed this

Second Day of March, 1993

*Attest:*

STEPHEN G. KUNIN

*Attesting Officer*     *Acting Commissioner of Patents and Trademarks*